United States Patent [19]

Mori et al.

[11] Patent Number: 4,941,269

[45] Date of Patent: Jul. 17, 1990

[54] THICKNESS MEASURING APPARATUS

[75] Inventors: Sanae Mori, Nagoya; Takayosi Sasaki, Tajimi; Takehiro Ozika, Nagoya, all of Japan

[73] Assignee: Daido Metal Company, Ltd., Nagoya, Japan

[21] Appl. No.: 389,201

[22] Filed: Aug. 3, 1989

[51] Int. Cl.$^5$ .............................................. G01B 7/12
[52] U.S. Cl. .................................... 33/783; 33/501.04; 33/797
[58] Field of Search ................. 33/783, 805, 807, 808, 33/501.02, 501.04, 501, 797–801

[56] References Cited

U.S. PATENT DOCUMENTS

| | | | |
|---|---|---|---|
| 4,279,079 | 7/1981 | Gamberini et al. | 33/797 X |
| 4,291,466 | 9/1981 | Bell et al. | 33/501.04 |
| 4,473,551 | 10/1984 | Golinelli et al. | 33/783 X |

FOREIGN PATENT DOCUMENTS 1043440  6/1953  France ................................... 33/807

Primary Examiner—Harry N. Haroian
Attorney, Agent, or Firm—Browdy and Neimark

[57] ABSTRACT

Disclosed is an thickness measuring apparatus comprising: a C-shaped block; a pair of arms which are provided on the block, each of which is equipped with a pivot section situated at one end thereof, each pivot section being equipped with a spring element; a pair of lever members pivotably mounted on the respective spring elements; measuring elements mounted on the respective outer end sections of the lever members and adapted to be brought into contact with the article to be measured; a first compression spring provided between one of the pair of arms and a section of one of the lever members which is near the inner end thereof so as to bias this lever member; a second compression spring provided between the other of the pair of arms and a section of the other of the lever members which is near the inner end thereof so as to bias this lever member; thickness measuring devices provided respectively on the pair of arms and adapted to detect any movement of the lever members so as to measure the thickness of the article; and a device for driving the inner ends of the lever members such that the outer ends of the lever members are spaced apart from each other.

3 Claims, 4 Drawing Sheets

THICKNESS MEASURING APPARATUS

BACKGROUND OF THE INVENTION

This invention relates to a thickness measuring apparatus, and in particular, to an apparatus which is capable of automatically performing the multipoint thickness measurement of the relatively narrow sections of an object such as a turbo T/W.

Conventionally, the multipoint thickness measurement of the relatively narrow sections of an object such as a turbo T/W has been performed manually using a measuring instrument such as a micrometer for the purpose of measuring the thickness of an object at each measurement point thereof.

In accordance with the above-described conventional multipoint measurement method, the same measurement operation has to be repeated several times at each measurement point of an object, so that the measurement work requires much time and labor. Furthermore, if the number of measurement points is large, it is quite possible that the judgment made by the measurer will include some errors, which will lead to a deterioration in measurement accuracy. Moreover, when measuring the thickness of a very narrow section, manual measurement by the measurer is rather difficult to perform.

SUMMARY OF THE INVENTION

This invention has been contrived with a view to eliminating the above-mentioned problems experienced with the prior art measuring method. It is accordingly an object of this invention to provide a thickness measuring apparatus which is capable of automatically performing with high accuracy the multipoint thickness measurement of the relatively narrow sections of an object, which has a simple structure and can be produced at low cost, and which is easy to handle and convenient for use.

In accordance with this invention, there is provided an apparatus for measuring a thickness of an article, comprising pivot means provided on tip ends of upper and lower arms of a generally C-shaped block; lever members pivotally mounted on said pivot means by spring elements; thickness measuring means provided on the outer ends of said lever members and having opposite measuring elements adapted to contact with said article for measurement of the thickness thereof; upper and lower spring members adapted to bias said lever members in a direction, in which said measuring elements come into contact with each other, and to act on said lever members such that a biasing force on said upper lever member is made larger than a biasing force on said lower lever member; thickness measuring devices provided on said arms and adapted to cooperate with said lever members to measure the thickness of said article; and means adapted to engage with the inner ends of said lever members to swing said lever members in a direction, in which said thickness measuring means is opened.

Thus, the thickness measuring means and the thickness measuring devices are connected to each other through the lever members, and, at the same time, any play or looseness in the rotation of the lever members is removed by means of the spring members provided on the pivot means, thereby enhancing the measuring accuracy. Furthermore, the pressurizing force exerted on the upper lever member is larger than that exerted on the lower lever member, so that the article to be measured can be reliably retained between the thickness measuring means. In addition, the rotation of the lever members is effected automatically by means of a lever member rotating device, thereby allowing the article to be easily set in and removed from a position between the thickness measuring means.

Furthermore, in accordance with this invention, the thickness measuring apparatus may constitute one of a plurality of measurement units which are disposed around an article to be measured.

Thus, the thickness apparatus of this invention allows thickness measurement at a plurality of positions in an article to be conducted simultaneously.

DESCRIPTION OF THE PREFERRED EMBODIMENTS

Figure 1:
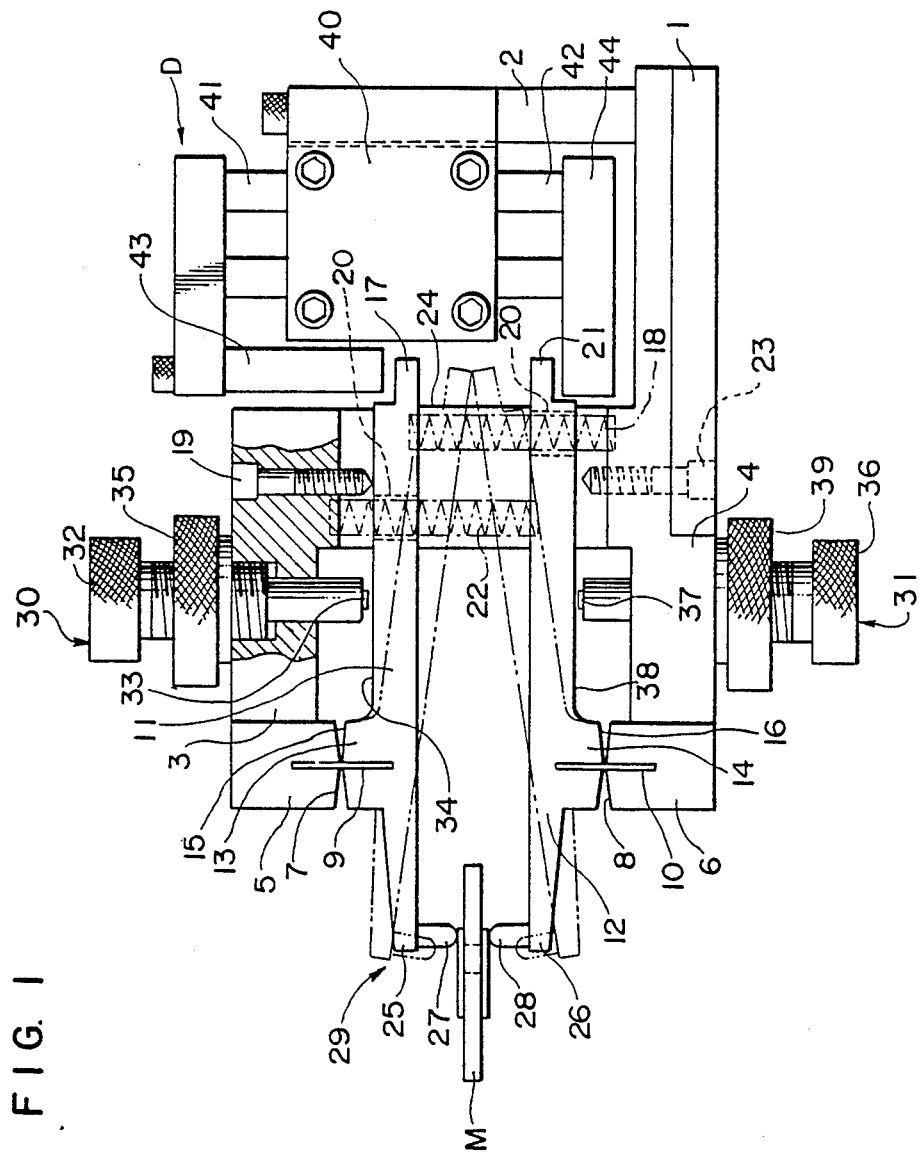
FIG. 1 is a side view of the essential part of an embodiment of this invention.
Figure 2:
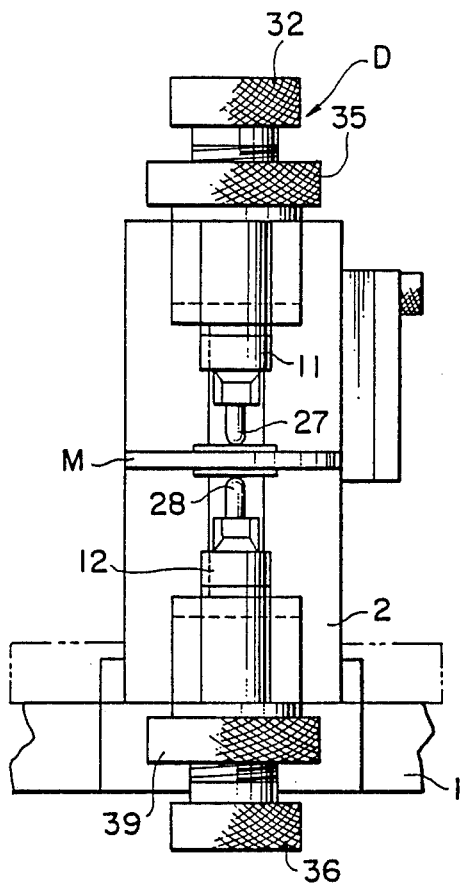
FIG. 2 is an end view of the embodiment shown in FIG. 1.
Figure 3:
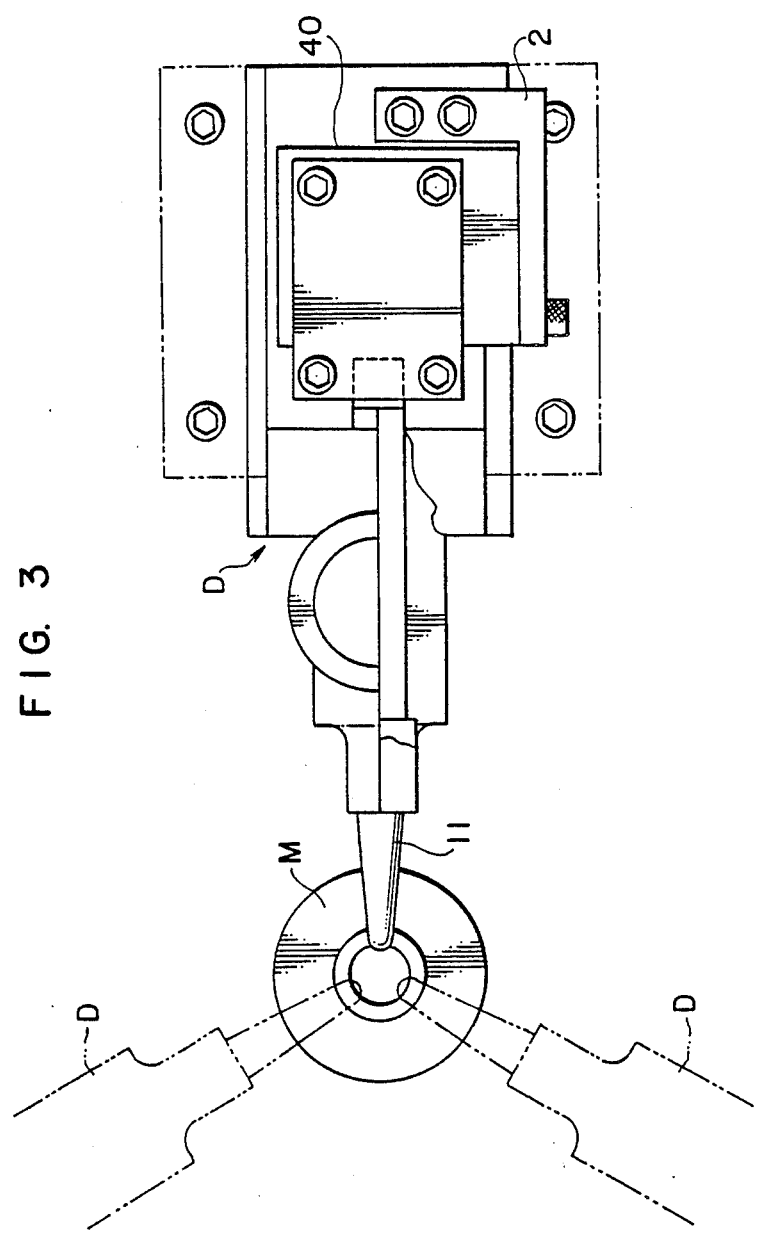
FIG. 3 is a top view of the embodiment shown in FIG. 1.

FIGS. 1, 2 and 3 show a preferred embodiment of the measuring apparatus in accordance with this invention. This embodiment comprises a generally C-shaped upright main body block 1 which includes an upright base 2 and a pair of integrally formed arms 3 and 4 extending transversely with respect to the base 2, substantially in parallel to each other. The arm 4 is fixed to the base 2, whereas the arm 3 is connected to the arm 4 through the intermediary of an intermediate member 24 such as a connecting rod. The arms 3 and 4 include respective pivot sections 5 and 6 provided at the ends thereof. Formed on the lower surface of the pivot section 5 and on the upper surface of the pivot section 6 are respective pivot surfaces 7 and 8 which are tapered in such a manner that they exhibit the maximum protrusion at the centers thereof (as seen in FIG. 1). Relatively thin plate spring members 9 and 10 are respectively embedded and fixed in the pivot surfaces 7 and 8 at the central protrusions thereof. The spring members 9 and 10 are arranged in such a manner that the embedded sections thereof extend in the vertical direction with respect to the horizontal direction as seen in FIG. 1, the rest of the spring members 9 and 10 protruding from the pivot surfaces 7 and 8.

The measuring apparatus shown further includes a pair of vertically arranged lever members 11 and 12 extending through the space between the pivot sections 5 and 6 to the exterior of the main body block 1. The lever members 11 and 12 have, in the middle sections thereof, respective pivot sections 13 and 14 which include respective pivot surfaces 15 and 16. These pivot surfaces 15 and 16 are tapered in the same manner as the pivot surfaces 7 and 8 of the pivot sections 5 and 6 provided on the arms 3 and 4 of the main body block 1. Embedded and fixed in the pivot surfaces 15 and 16 at the central protrusions thereof are the respective protruding sections of the spring members 9 and 10. At the same time, the respective central protrusions of the pivot surfaces 15 and 16 are abutting against and supported by those of the pivot surfaces 7 and 8 of the pivot sections 5 and 6. With this construction, the lever members 11 and 12 can easily rotate in the vertical direction around the central protrusions of the respective pivot surfaces 15 and 16, the spring members 9 and 10 serving to eliminate any play or looseness in the rotation of the lever members 11 and 12. Instead of the plate spring members 9 and 10, thin bar-like spring members may be employed and arranged at the respective central protrusions of the pivot surfaces 7, 8 and 15, 16.

Mounted on the upper lever member 11 at a position near the inner end 17 thereof is one end of a compression coil spring member 18. The other end of the compression coil spring member 18 is fixed to the lower arm 4 of the main body block 1, the compression coil spring member 18 pressurizing the lever member 11 counterclockwise, as seen in FIG. 1, around the central protrusion of the pivot surface 15 of its pivot section 13. The counterclockwise rotation of the lever member 11 by the above-mentioned pressurizing force is limited by the lever block member 11 abutting against the lower end of an adjustable screw stopper 19 screwed into the upper arm 3 of the main body block 1 and protruding downwards therefrom. The compression coil spring member 18 extends vertically through a hole 20 provided in the lower lever member 12. The action of the compression coil spring member 18 has nothing to do with the lower lever member 12, being designed to exert its resilient force exclusively on the lever member 11.

Likewise, the lower lever member 12 is pressurized clockwise, as seen in FIG. 1, around the central protrusion of the pivot surface 16 of its pivot section 14 by a compression coil spring member 22 arranged between a section thereof which is near its inner end 21 and the upper arm 3. The clockwise rotation of the lever member 12 effected by this pressurizing force is limited by the lever member 12 abutting against the upper end of an adjustable screw stopper 23 screwed into the lower arm 4 and protruding upwards therefrom. The compression coil spring member 22 extends in the vertical direction through a hole 20 provided in the upper lever member 11; the action of the compression spring member 22, which is designed to exert resilient force only on the lower lever member 12, has nothing to do with the lever member 11.

The compression coil spring members 18 and 22 can be made of substantially the same material. However, the compression coil spring member 18 is situated at a position nearer to the respective inner ends 17 and 21 of the lever members 11 and 12 than the compression coil spring member 22. In other words, it is situated more apart from the respective pivot sections 5 and 6 than the compression coil spring member 22. Alternatively, the compression coil spring member 18 may be made of a stronger spring material than that of the compression coil spring member 22, thereby enabling the upper lever member 11 to receive a stronger resilient force than the lower lever member 12.

The lever members 11 and 12 include respective measuring elements 27 and 28 provided on the respective inner surfaces at the ends 25 and 26 thereof and protruding therefrom. The measuring elements 27 and 28, arranged symmetrically face to face and detachably attached to the lever members 11 and 12 by appropriate means such as screws, are made of cemented carbide chips or the like and have rounded ends between which a measurement object M is to be set, thus forming a thickness measuring means 29. As stated above, the upper lever member 11 receives a larger pressurizing force than the lower lever member 12, so that the upper measuring element 27 is capable of applying a higher measurement pressure to the object M than the lower measuring element 28. Consequently, the thickness measurement of the object M can be conducted without using any additional retainer for retaining the object M.

Further, thickness measuring devices 30 and 31 are respectively provided, in a symmetrical arrangement, on the arms 3 and 4 of the main body section 1. The thickness measuring device 30 has a pneumatic nozzle member 32 which constitutes the head of a pneumatic measurement gauge. This pneumatic nozzle member 32 is screwed into the upper arm 3 in such a manner as to allow fine adjustment with respect to this arm 3. At the same time, the pneumatic nozzle member 32 includes a nozzle end section 33 which protrudes downwards from the arm 3 to a position in the vicinity of the upper surface 34 of the upper lever member 11. Further, a lock nut 35 is provided on the pneumatic nozzle member 32; by fastening this lock nut 35, the pneumatic nozzle member 32 can be fixed at any position in the vertical direction. With this construction, the space between the nozzle end section 33 of the pneumatic nozzle member 32 and the upper surface 34 of the lever member 11 can vary in accordance with the thickness of the object M set between the measuring elements 27 and 28.

Likewise, the thickness measuring device 31 provided on the lower arm 4 has a pneumatic nozzle member 36 constituting the head of a pneumatic measurement gauge. This pneumatic nozzle member 36 is screwed into the lower arm 4 in such a manner as to allow fine adjustment with respect to this arm 4. At the same time, the nozzle end section 37 of the pneumatic nozzle member 36 protrudes upwards from the arm 4 to a position in the vicinity of the lower surface 38 of the lower lever member 12. Further, a lock nut 39 is attached to the pneumatic nozzle member 36. By fastening this lock nut 39, the pneumatic nozzle member 36 can be fixed at any desired position in the vertical direction. With this arrangement, the space between the nozzle end section 37 and the lower surface 38 of the lever member 12 can vary in accordance with the thickness of the object M which is set between the measuring elements 27 and 28.

Thus, signals which are responsive to variances in the respective spaces between the nozzle end section 33 and the upper surface 34 of the lever member 11 and between the nozzle end section 37 and the lower surface 38 of the lever member 12, are transmitted from the thickness measuring devices 30 and 31 to an appropriate arithmetic circuit (not shown), thereby allowing the thickness of the section of the object M which is held between the measuring elements 27 and 28 to be measured automatically without involving any errors. As desired, the pneumatic gauges constituting the thickness measuring devices 30 and 31 may be replaced by generally well-known displacement detectors, such as electronic indicators, dial gauges, or clearance sensors.

Further, mounted on the base 2 of the main body block 1 is a pneumatic cylinder 40 which supports plungers 41 and 42, respectively protruding upwards and downwards therefrom, in such a manner as to allow them to make a reciprocating movement. Fixed to the outer end of the upper plunger 41 is a bracket member 43 which is adapted to come into contact with the inner end 17 of the upper lever member 11 when the plunger 41 is drawn back into the cylinder 40. This contact movement causes the lever member 11 to rotate clockwise, thereby causing the measuring element 27 to move upwards. Likewise, a bracket member 43 is fixed to the outer end of the lower plunger 42; the bracket member 44 is adapted to come into contact with the inner end 21 of the lower lever member 12 when the plunger 42 is drawn back into the cylinder 40. This contact movement causes the lever member 12 to rotate counterclockwise, thereby causing the measuring element 28 to move downwards. The pneumatic cylinder 40 is operated in this way when the object to be measured is set in and removed from a position between the measuring elements 27 and 28, allowing these elements to be spaced far apart from each other.

Figure 4:
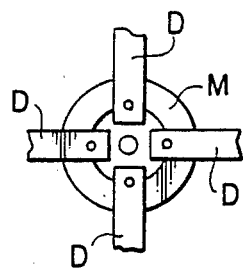
FIG. 4 is a schematic top view showing the essential part of another example of arrangement in the embodiment of the thickness measuring apparatus shown in FIG. 1.
Figure 5:
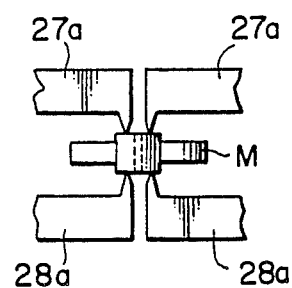
FIGS. 5, 6, 7, 8 and 9 show modifications of the thickness measuring means for measuring articles having different configurations.
Figure 6:
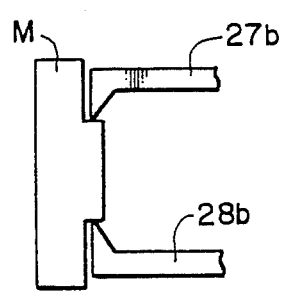
Figure 7:
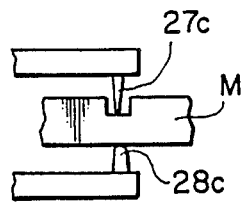
Figure 8:
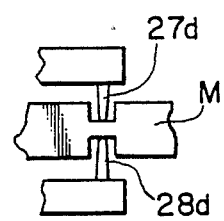
Figure 9:
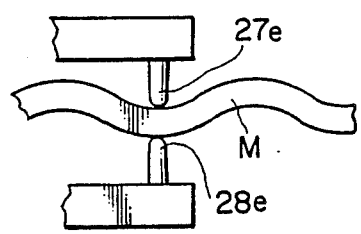

The thickness measuring apparatus having the above-described construction may constitute a measurement unit D. In this embodiment, three such units D are arranged, spaced from each other by substantially the same angle, around a measurement object M, as shown in FIG. 3. This arrangement allows automatic thickness measurement of the object M to be conducted at three different positions thereof, simultaneously and with accuracy. As will be understood, the number of units D may be changed as needed. For example, four measurement units D can be arranged around an object M, as shown in FIG. 4.

In the examples shown in FIGS. 5, 6, 7, 8 and 9, different configurations are adopted for the measuring elements with a view to allowing the thickness measurement of objects M having various configurations. In the example shown in FIG. 5, the measuring elements 27a and 28a have pointed end sections so that the multi-point simultaneous measurement of narrow sections in an object M can be performed. The measuring elements 27b and 28b shown in FIG. 6 have pointed end sections, and extend forward in a slightly inclined state, thereby making it possible to measure a narrow step section in an object M with ease. In the example shown in FIG. 7, the upper measuring element 27c has a thin and pointed end section adapted to be inserted into a narrow groove in an object M so that the thickness thereof at the groove bottom can be measured with ease. In the example shown in FIG. 8, both upper and lower measuring elements 27d and 28d have thin and pointed end sections, so that the thickness of an object M between the bottoms of grooves on both sides thereof can be measured easily. The measuring elements 27e and 28e in the example shown in FIG. 9 have hemispherical end sections; this allows the thickness of an object M which is curved like a wave to be measured with accuracy.

With the above-described construction of this invention, an object to be measured is held between the measuring elements in a relatively free state, the spring members provided on the pivot sections serving to eliminate any hysteresis in the rotation of the lever members. This arrangement makes it possible to conduct thickness measurement of an object with high accuracy, to measure the thickness of relatively narrow sections in an object with ease, to effect thickness measurement at a plurality of sections of an object simultaneously and correctly, etc.

What is claimed is:

1. An apparatus for measuring a thickness of an article, comprising pivot means provided on tip ends of upper and lower arms of a generally C-shaped block; lever members pivotally mounted on said pivot means by spring elements; thickness measuring means provided on the outer ends of said lever members and having opposite measuring elements adapted to contact with said article for measurement of the thickness thereof; upper and lower spring members adapted to bias said lever members in a direction, in which said measuring elements come into contact with each other, and to act on said lever members such that a biasing force on said upper lever member is made larger than a biasing force on said lower lever member; thickness measuring devices provided on said arms and adapted to cooperate with said lever members to measure the thickness of said article; and means adapted to engage with the inner ends of said lever members to swing said lever members in a direction, in which said thickness measuring means is opened.

2. An apparatus as set forth in claim 1, wherein said apparatus is made up of a plurality of units which are disposed around said article being measured.

3. A thickness measuring apparatus comprising a C-shaped block; a pair of arms provided on said block and each having pivot means on one end thereof, which pivot means is provided with spring elements; a pair of lever members pivotally mounted on the respective spring elements; measuring elements each mounted on the outer end of the respective lever members and adapted to contact with an article being measured; a first compression spring provided between one of said arms and a portion of one of said lever members near the inner end thereof to bias said one of the lever members; a second compression spring provided between the other of said arms and a portion of the other of said lever members near the inner end thereof to bias the other of said lever members; thickness measuring devices provided on said arms for detecting movements of said lever members to measure the thickness of said article; and means for driving the inner ends of said lever members so that the outer ends of said pair of lever members are spaced away from each other.

* * * * *